(12) United States Patent
Tournier et al.

(10) Patent No.: US 7,544,028 B2
(45) Date of Patent: Jun. 9, 2009

(54) CAGE FOR ELECTRICAL CONNECTION NUT

(75) Inventors: Gilles Tournier, Leguevin (FR); Stephanie Klepka, Saint Orens (FR)

(73) Assignee: Airbus France, Toulouse (FR)

( * ) Notice: Subject to any disclaimer, the term of this patent is extended or adjusted under 35 U.S.C. 154(b) by 95 days.

(21) Appl. No.: 11/183,990

(22) Filed: Jul. 19, 2005

(65) Prior Publication Data

US 2006/0018731 A1    Jan. 26, 2006

(30) Foreign Application Priority Data

Jul. 23, 2004  (FR) .................................. 04 51644

(51) Int. Cl.
*F16B 39/32* (2006.01)
(52) U.S. Cl. .................. 411/121; 411/128; 411/130
(58) Field of Classification Search ......... 411/111–113, 411/119–122, 116, 125–131
See application file for complete search history.

(56) References Cited

U.S. PATENT DOCUMENTS

| 71,722 | A | * | 12/1867 | Ellsworth | 411/121 |
|---|---|---|---|---|---|
| 434,933 | A | * | 8/1890 | Jackman | 411/128 |
| 616,969 | A | * | 1/1899 | Pyle | 411/129 |
| 1,633,176 | A | * | 6/1927 | Goeller | 439/202 |
| 1,720,067 | A | * | 7/1929 | Weisgerber | 439/759 |
| 2,034,051 | A | * | 3/1936 | Lipp | 403/374.4 |
| 2,082,228 | A | * | 6/1937 | Stoll | 123/90.52 |
| 2,356,934 | A | * | 8/1944 | Ketcham | 248/27.1 |
| 2,477,178 | A | * | 7/1949 | Hallock | 411/551 |
| 2,798,770 | A | * | 7/1957 | Terrick | 301/35.624 |
| 2,832,254 | A | * | 4/1958 | Varon et al. | 411/80.1 |
| 3,413,886 | A | * | 12/1968 | Proctor | 411/45 |
| 3,414,154 | A | * | 12/1968 | Rose et al. | 220/3.7 |
| 3,419,057 | A | * | 12/1968 | Hogan | 411/125 |
| 3,783,922 | A | * | 1/1974 | Petrus | 411/111 |
| 4,790,701 | A | * | 12/1988 | Baubles | 411/85 |
| 4,999,019 | A | * | 3/1991 | Kraus | 411/512 |
| 5,380,136 | A | * | 1/1995 | Copple et al. | 411/183 |
| 5,630,686 | A | * | 5/1997 | Billmann | 411/112 |
| 5,632,584 | A | * | 5/1997 | Acevedo | 411/182 |
| 5,683,216 | A | * | 11/1997 | Erbes | 411/120 |
| 5,688,091 | A | * | 11/1997 | McKinlay | 411/149 |
| 5,816,762 | A | * | 10/1998 | Miura et al. | 411/433 |
| 6,364,587 | B1 | * | 4/2002 | Ingvarsson | 411/116 |
| 6,582,171 | B2 | * | 6/2003 | Bondarowicz et al. | 411/353 |
| 6,769,850 | B2 | * | 8/2004 | Lay | 411/112 |
| 6,896,463 | B2 | * | 5/2005 | Tuthill | 411/116 |

(Continued)

FOREIGN PATENT DOCUMENTS

DE    33 20 679 A1    12/1984

(Continued)

*Primary Examiner*—Flemming Saether
(74) *Attorney, Agent, or Firm*—Oblon, Spivak, McClelland, Maier & Neustadt, P.C.

(57) ABSTRACT

The invention divulges a method of installing a nut in a cage in order to make a secure connection of two elements by screwing the nut on a threaded rod, particularly in the case in which the electrical connection is made using a lug. The cage is in the form of a cylinder comprising elastic inner strips that enable blocking of the washer and the nut, and ensure a constant pressure with time.

17 Claims, 5 Drawing Sheets

U.S. PATENT DOCUMENTS

| | | | |
|---|---|---|---|
| 7,059,022 B2 * | 6/2006 | Yuta et al. | 24/297 |
| 7,083,372 B2 * | 8/2006 | Winker | 411/313 |
| 7,114,901 B2 * | 10/2006 | Maruyama et al. | 411/353 |
| 7,192,319 B1 * | 3/2007 | Rahman et al. | 439/766 |
| 7,204,666 B2 * | 4/2007 | Hullman et al. | 411/111 |
| 2005/0079028 A1 * | 4/2005 | Hewgill | 411/149 |
| 2005/0271492 A1 * | 12/2005 | Jackson et al. | 411/112 |

FOREIGN PATENT DOCUMENTS

| | | |
|---|---|---|
| DE | 85 23 553 U1 | 10/1985 |
| GB | 127246 | 5/1920 |
| NL | 45 978 | 1/1939 |

* cited by examiner

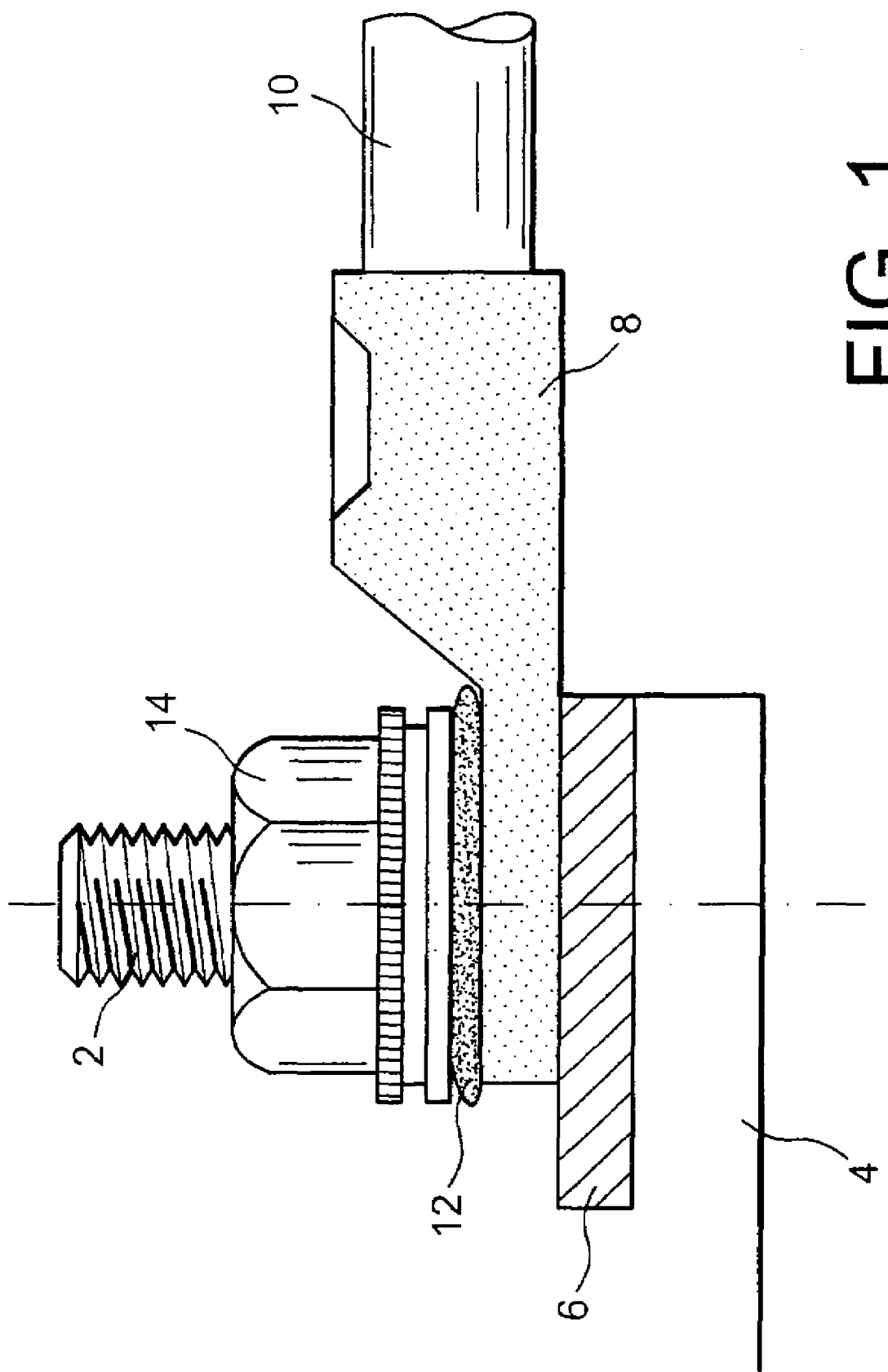

CAGE FOR ELECTRICAL CONNECTION NUT

TECHNICAL FIELD AND STATE OF PRIOR ART

The invention relates to the field of attachment means, particularly in the case in which the connection is electrical.

Screw and nut attachment systems are very old and frequently used. They can be used to assemble several mechanical parts while it remains possible to disassemble the assemblies created for modification or maintenance purposes. The addition of washers or stop platelets increases the reliability of this type of assembly when subject to aggression during use, particularly by vibration: vibrations can facilitate unscrewing of nuts and therefore cause loss of unity of the assembly.

This type of assembly has also been used for electrical connections. Thus, a normalized lug with a round contact fixed to an electrical cable enables easy placement and maintenance by screwing the lug onto and/or unscrewing it from a conducting support. FIG. 1 shows the most frequently used assembly for such electrical connections.

In this example, a threaded rod 2 is fixed in translation and rotation to an insulating block 4. A conducting part 6, for example the lug of a circuit breaker or other equipment, is either fixed to the insulating block 4, or is installed in contact with it by insertion on the rod 2. A lug 8 is crimped onto the core of an electrical cable 10, for example a multi-strand cable with peripheral insulation. The lug 8 is slid onto the threaded rod 2 to come into contact with the conducting part 6, and an elastic washer 12 is superposed on it. The pressure applied by screwing the nut 14 onto the rod 2 pushes the washer 12 and compresses the lug 8 on the conducting part 6, which enables electrical current to pass between the cable 10 and the equipment through the conducting part 6. Some variants make use of <<lock>> washers or elastic washers and special nuts called <<self-locking>> nuts that are supposed to increase the mechanical strength while preventing loosening which is always possible.

The assembly shown diagrammatically in FIG. 1 enables easy connection during manufacturing and makes it very easy to replace connected equipment in the case of a failure. Consequently, this type of assembly is most frequently used for electrical connections on board aircraft.

However, some problems have not yet been solved:
- the washer 12 can be forgotten, or it can be positioned between the equipment 6 and the lug 8, which modifies or even eliminates the electrical connection;
- the pressure applied on the lug 8, and therefore on the equipment 6, depends on the spring effect provided by the threaded rod 2. When the environment includes a wide range of negative and positive temperatures, which is normally the case in aeronautics, the pressure and therefore the current conduction can be modified;
- the original pressure applied by the nut 14 should be accurately calibrated to give a good electrical quality of the connection. The use of connected elements of the assembly, particularly the various washers 12 and especially <<self-locking>> type nuts, modify the applied torque due to poor homogeneity of the value of the locking torque thus added.

It has been proposed to add a cage, and then an element filling in the space between the screw and the nut (for example see DE 33 206 79) to prevent loosening, but this considerably extends the placement time.

PRESENTATION OF THE INVENTION

The main purpose of this invention is to overcome these observed faults and to provide a better guarantee for the required functions in the long term. In particular, it assures a constant applied pressure and complete immunity to accidental loosening.

According to one of its aspects, the purpose of the invention is a connection device that includes a nut associated with an insertion cage; the cage is inserted on the threaded rod after two elements to be connected, particularly electrical elements, have been positioned, and before the nut and any washers that are tightened in this cage.

In particular, the invention relates to a cage for a generally cylindrical connection in which nut and washers can be inserted. The cage includes one open end and one end closed by a wall in which an orifice is drilled so that the threaded rod can pass through it. Strips are connected to the open end and are directed towards the inside of the cage. They can fold down along the walls, particularly during an insertion of the nut, and then apply pressure on the elements inserted on the threaded rod in the cage.

The different elements of the cage may have different shapes depending on the required connection type; the cage itself is preferably a cylindrical cage of revolution, the orifice of the wall closing the cage may be circular or asymmetric, and the number of strips depends on the size of the cage. In particular, the strips may be of a different nature and shape within the same cage, for example locking strips may be provided adjacent to holding strips.

Advantageously, the cage according to the invention is associated with an adapted nut, which may be a standard nut. The nut may also comprise an area with a larger diameter that blocks it through the free end of the strips of the cage, and which enables the use of a pipe wrench to place the assembly and/or to separate the assembly. One or several washers may be associated with the connection device.

Preferably, the cage according to the invention is used for an electrical connection.

BRIEF DESCRIPTION OF THE DRAWINGS

The attached drawings will help to better understand the invention, but they are only given for guidance and they are in no way restrictive.

FIG. 1, already described, represents a plan view of an electrical connection system using a nut and a threaded rod according to the state of the art.

DETAILED PRESENTATION OF PARTICULAR EMBODIMENTS

The invention relates to a cage that could be used on and with existing equipment. In particular, the threaded rod 2 can remain unchanged to prevent extra costs, which can be very high, due to a major modification to the equipment.

Figure 2A:
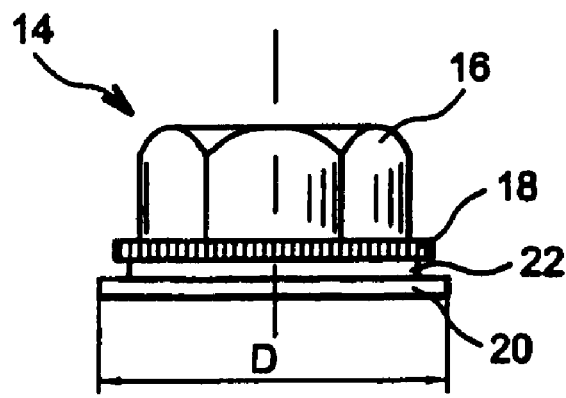
FIGS. 2A and 2B show plan views of an embodiment of the different parts of a connection device according to the invention.

Furthermore, the nut used with the cage and in the device according to the invention may be identical to those used for existing connections. In particular, the nut 14 has a completely conventional ISO type tapped inner part; the diameter of the inner thread is measured in mm or in inches. Advantageously, and as shown in FIG. 2A, the nut 14 has several distinct areas on the outside. An upper part 16 is used for entrainment by screwing and unscrewing; conventionally, it may have 6 sides or 12 sides, etc. depending on the wrench that will be used.

Adjacent to this entrainment part 16, there is advantageously a cylindrical part in relief (in other words larger) 18, with a knurled surface around the periphery. The end of the nut 14 facing the elements to be connected, or the bottom of the nut, preferably has a smooth and cylindrical part 20. As will be described later, the base part 20 advantageously has a diameter D larger than the knurled part 18, which increases the surface area of the bottom of the nut 14. There is a groove 22 facilitating the various machining operations between the knurled part 18 and the base 20.

Figure 2B:
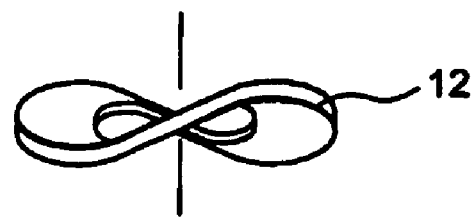
Figure 2C:
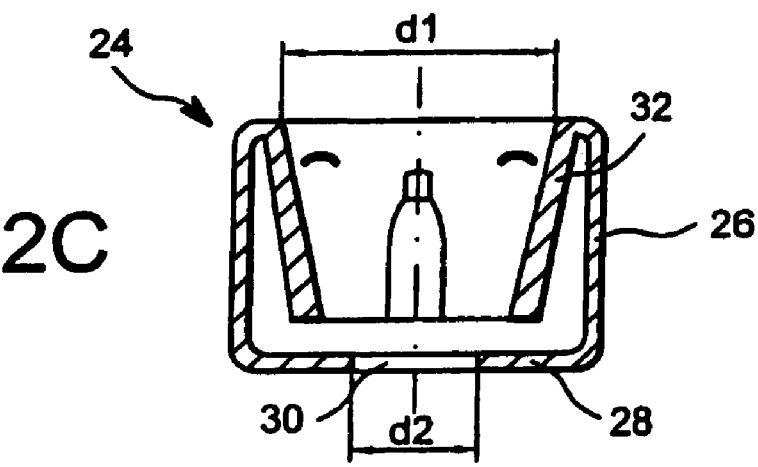
FIG. 2C shows a sectional view of the embodiment shown in FIG. 2A.

As for conventional assemblies, one or several elastic washers 12 (FIG. 2B) may be inserted between the nut 14 described above and the cage 24, described with reference to FIG. 2C.

Figure 6:
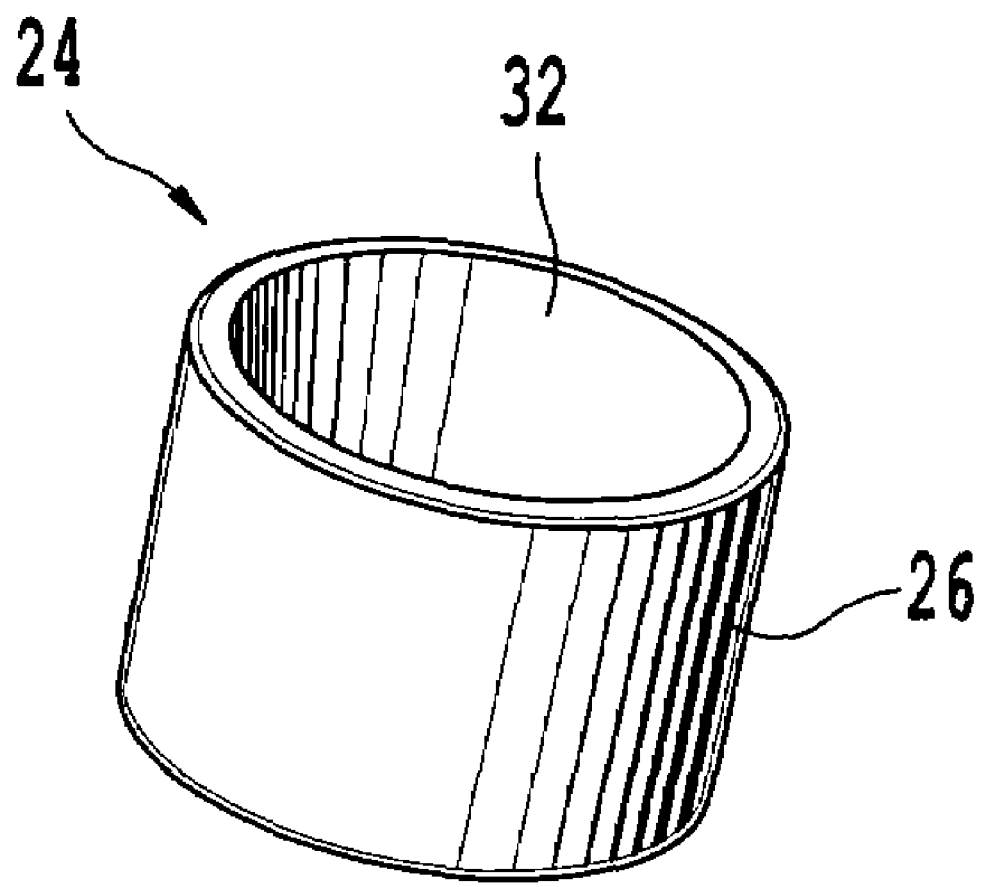
FIG. 6 shows a plan view of an embodiment of a connection device.

In general, the cage 24 is shallow and cylindrical, preferably a cylinder of revolution, as shown in FIG. 6, although any other shape would be possible. The cylinder is composed of a lateral wall 26 and an end wall 28, more commonly called a bottom wall or bottom. The cage 24 may be made from any material and using any known technique; for example, the cage 24 is made individually and is stamped, and made of brass, cupronickel, treated steel or stainless steel.

The nut 14 must be able to penetrate and rotate in the cage 24 and therefore the first open or top end of the side wall 26 has an inside diameter d1 greater than the maximum diameter D of the base 20 of the nut 14 in the case of the nut shown diagrammatically in FIG. 2A. The bottom 28 of the cage 24 also has a hole 30 through which the threaded rod 2 of the assembly can pass. The hole 30 is preferably centred on the bottom 28 and may be circular; the second diameter d2 of the circle inscribed in the hole 30 is then larger than the inside diameter of the threaded nut 14 so as to facilitate insertion of the cage 24 on the rod 2.

The first end of the lateral cylindrical wall 26, or the top part, has several strips 32 folded inwards. One end of each of the strips 32 is directly connected, in other words fixed, to the cage 24 and the other end is free. Preferably, the strips 32 form the integral part of the cage 24, in other words they are formed as a single part with the cage. The strips 32 have an elasticity between a first rest position in which they are shown diagrammatically in FIG. 2C, and a second position in which the angle that they form with the cylindrical wall 26 reduces. The opening formed by the free ends of the strips 32 is advantageously larger that the threaded rod 2 and the orifice 30, to facilitate insertion.

The washer 12 is pushed into the bottom of the cage 24, where it is trapped after having passed between the elastic strips 32, so as to make an assembled configuration similar to that shown in FIG. 1 (and diagrammatically in FIG. 3). Similarly, the nut 14 is pushed towards the bottom of the cage 24, and is trapped in it also as soon as the base 20 of the nut goes beyond the free end of the strips 32, which fold down on the parts of the nut with a smaller diameter. The elastic washer 12 is then sandwiched between the nut 14 and the cage 24.

Figure 3A:
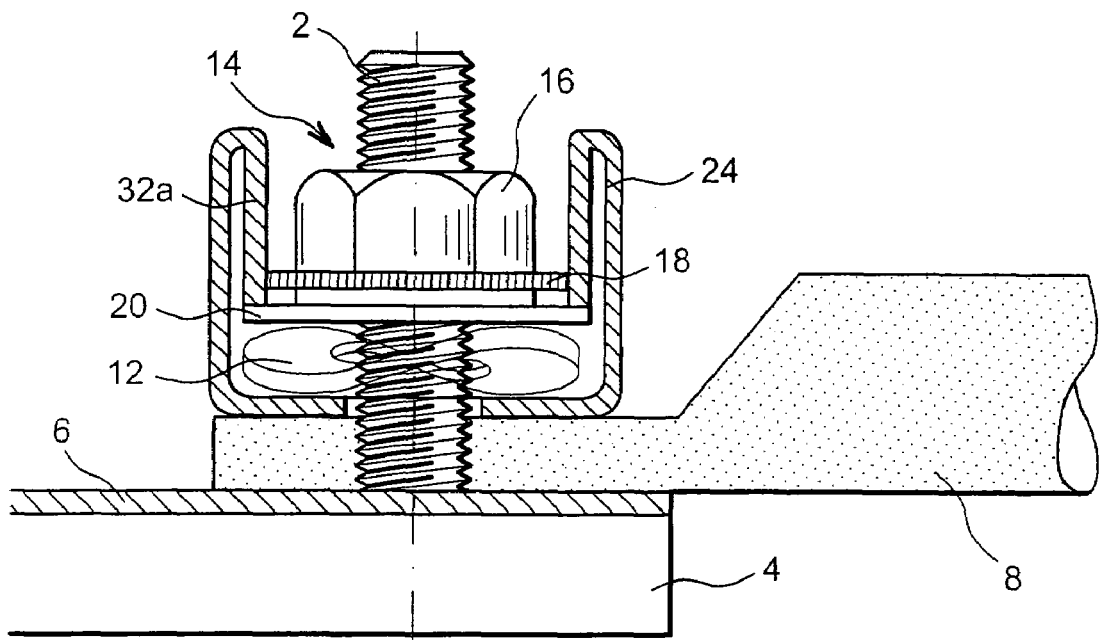
FIGS. 3A and 3B show partial lengthwise sectional views of an electrical connection system using a device according to one embodiment of the invention.

As shown diagrammatically in FIG. 3, various configurations of strips 32, particularly different lengths and/or elasticity, are possible and can coexist within the same insertion cage 24. In particular, FIG. 3A shows holding strips 32a that fold down onto a part of the nut 14, particularly on the base 20 of the nut 14, to clamp it; the elastic strips 32a thus hold the assembly in place.

Figure 3B:
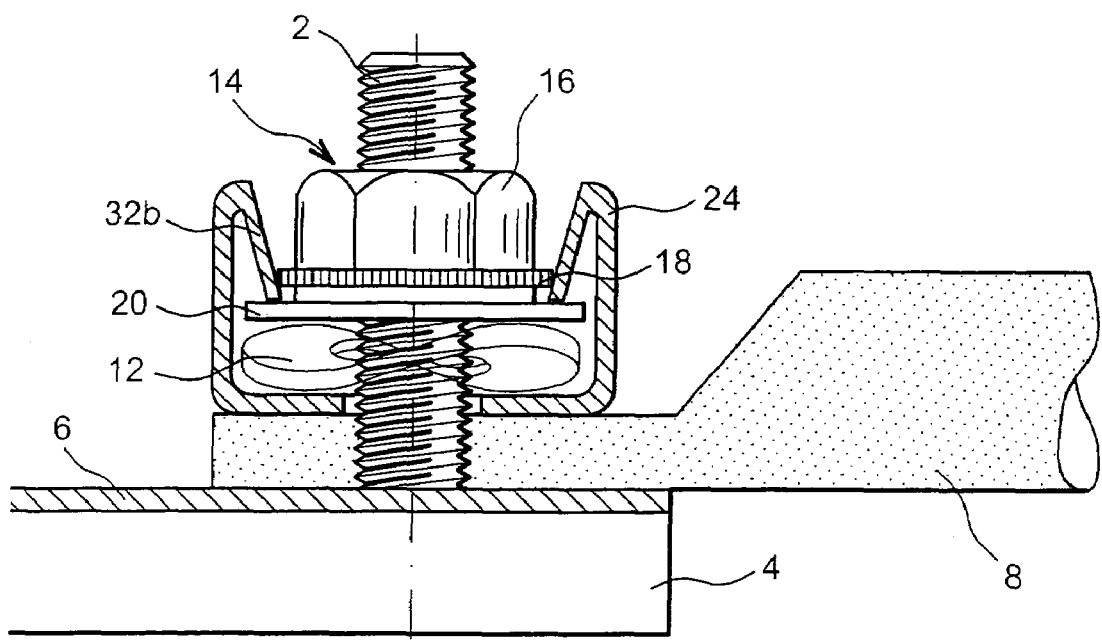

Strips shown diagrammatically in FIG. 3B may also induce a ratchet type locking. One or several lock strips 32b are calibrated such that the shape of their free end is such that it is blocked in contact with the knurled part 18 with no risk that the end will slide; the strips 32b lock the nut 14 during deliberate or accidental loosening. Asymmetric shapes of the knurled part 18 and lock strips 32b could be made so as to improve resistance to loosening while keeping the tightening value low.

The number of strips 32 depends on how the cage 24 is used and the material from which they are made. Preferably, three strips will be chosen for small diameters and these strips will perform two functions, firstly to hold the nut 14 in place and secondly to lock it using cut off edges; for large diameter threaded rods 2 and nuts 14, it will be preferred to use three holding strips 32a associated with one or several locking strips 32b, for example with alternation between the holding strips 32a and the locking strips 32b.

The assembly formed according to the invention is compact, with no risks of losing or forgetting a component. The pressure between the lug 8 and the conducting part 6 of the equipment is calibrated and constant with regard to the environment, due to the compensating spring effect of the elastic washer 12. The assembly provides resistance to loosening due to the elastic lock strips 32b. A large contact surface 28 distributes forces and controls the pressure on the lug 8.

Figure 4:
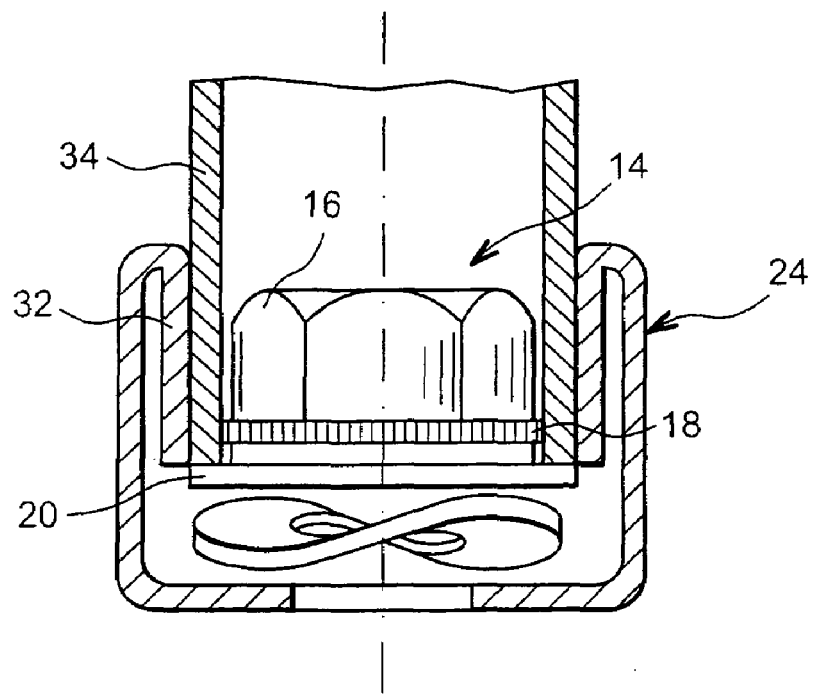
FIG. 4 shows a partial lengthwise sectional view of an example of a device according to the invention during assembly.

Depending on the choice of the relative dimensions of the upper part 16 of the nut 14 and the inside diameter d1 of the cage 24, the assembly may be facilitated by insertion of a wrench 34 to loosen or tighten the device as shown diagrammatically in FIG. 4. This enables holding the nut 14 on the wrench 34 for manipulating and releasing the lock strips 32b if they are present; it is possible to not release the holding strips 32a so that the cohesion of the cage assembly remains entire. The outside diameter of this wrench 34 is preferably adjusted to provide these advantages without forcing so that the elasticity of the strips 32 is not destroyed.

In particular, the device according to the invention can be disassembled by the use of such a wrench 34 which, when it is inserted, pushes the strips 32 away, separating them from the nut 14, however the strips 32 remain vertical or almost vertical, and in contact with the wrench 34 due to their elasticity. This enables unscrewing of the nut 14 and possible replacement of some parts of the assembly.

The invention also enables easy manipulation in a confined medium for example like aircraft, since the nut 14 is trapped by the wrench 34 useful for tightening and loosening and therefore can be manipulated. Furthermore, a calibrated tightening value can be applied, without it being affected by a random locking value since the strip lock is inactive during this operation, because all strips 32 are moved away from the knurled area 18 and have no influence on rotation of the nut 14.

With the invention, a large elastic reserve can be maintained during use so that the pressure remains constant to achieve good electrical conductivity. Thus, the assembly formed offers all the required qualities once the elastic washer 12 has been tightened and compressed.

Figures 5A, 5B:
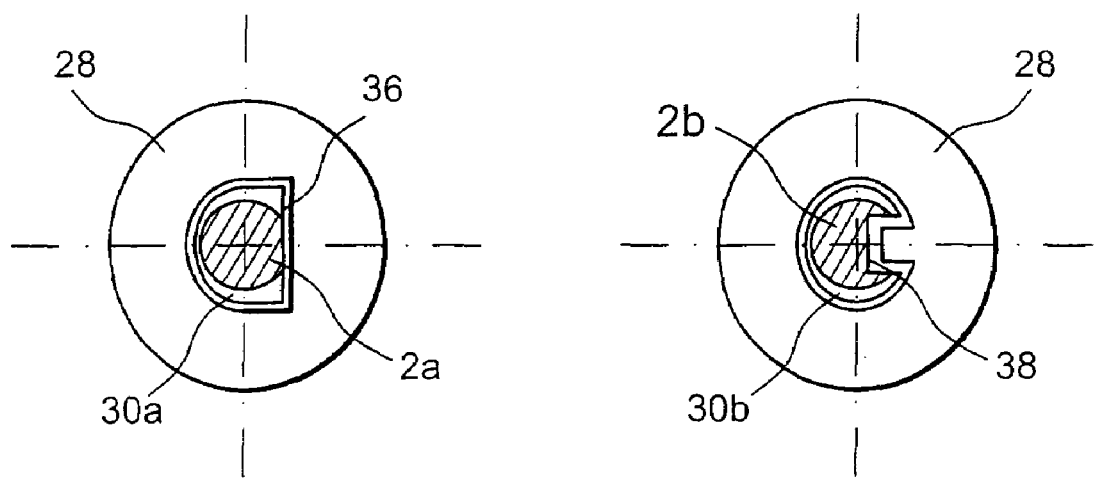
FIGS. 5A and 5B show cross sectional views taken at a bottom part of a cage of alternatives for the bottom part of a cage according to the invention.

The reliability of this assembly can be increased by adding a calibrated shape on the threaded rod 2, either a longitudinal flat 36 or a slit 38, for example made by form cutter as shown diagrammatically in FIGS. 5A and 5B. Thus, a part in relief with the opposite shape on the orifice 30 of the cage 24 of the nut 14 prevents any rotation of the cage 24 with respect to the threaded rod 2a, 2b, the relative translation of the parts remaining uncontrolled for tightening and loosening of the nut 14.

A special device can also be added to the upper part 16 of the nut reserved for driving in rotation, for example a part to be broken off or a resistance to torsion, to improve calibration of the tightening force and therefore the pressure.

The invention claimed is:

1. Insertion cage for a connection between a threaded nut and a threaded rod, comprising:
    a cylindrical wall having a top end and a bottom end, the top end circumscribing a circle with a first diameter;
    a bottom wall connected to the bottom end and having an orifice with a second diameter; and
    at least one strip located inside a space formed by the cylindrical wall and having a first end and a second end, wherein
    the first end of each at least one strip is fixed to the top end of the cylindrical wall, the second end of each at least one strip is free, and
    each at least one strip is folded down along the cylindrical wall to act as a spring between a first at rest position in which the at least one strip is inclined by a first angle from the cylindrical wall and a second compressed position in which the at least one strip is inclined by a second angle smaller than the first angle to apply pressure on the threaded nut inserted on the threaded rod in the cage.

2. Cage according to claim 1, in which a passage formed by the second end of each at least one strip is larger than the orifice.

3. Cage according to claim 1, in which the cylindrical wall, the bottom wall, and each at least one strip are made as a single part.

4. Cage according to claim 1, in which the orifice is circular and centred on the bottom wall.

5. Cage according to claim 1, in which the orifice comprises an asymmetric part.

6. Cage according to claim 1, further comprising:
    three strips and/or second locking strips.

7. Connection device, comprising:
    the cage according to claim 1; and
    a threaded nut,
    wherein an exterior of the nut has a diameter smaller than the first diameter of the circle circumscribed by the top end of the cage.

8. Connection device according to claim 7, in which an innermost diameter of a thread of the nut is smaller than the second diameter of the orifice.

9. Connection device according to claim 8, further comprising:
    a threaded rod adapted to a thread diameter of the nut.

10. A connection system, comprising:
    the insertion cage according to claim 1;
    a conducting part configured to conduct electricity; and
    a holding nut device configured to restrict movement of the conducting part,
    wherein the insertion cage is configured to position the holding nut device to restrict the movement of the conducting part such that an electrical connection is maintained.

11. Connection device on a threaded rod, comprising:
    a threaded nut; and
    an insertion cage including
    a cylindrical wall between a top end and a bottom end, into which the nut can penetrate,
    a bottom wall connected to the bottom end and including an orifice through which the rod can pass, and
    at least one strip located inside a space delimited by the cylindrical wall, wherein
    each at least one strip has a first end connected to the top end of the cylindrical wall and a second free end, such that the at least one strip is folded down along the cylindrical wall to act as a spring between a first at rest position in which the at least one strip is inclined by a first angle from the cylindrical wall and a second position compressed against the nut in which the at least one strip is inclined by a second angle smaller than the first angle to apply pressure on the threaded nut inserted on the threaded rod in the cage.

12. Connection device according to claim 11, in which the at least one strip includes locking strips and holding strips.

13. Connection device according to claim 11 in which the at least one strip forms a single part with the cylindrical wall of the cage.

14. Connection device according to claim 11, further comprising:
    a washer that can be installed on the rod and in the cage.

15. Connection device according to claim 11, in which the nut includes a base part having an outside diameter larger than an outside diameter of a remaining part of the nut.

16. Connection device according to claim 15, wherein the nut is configured to receive a wrench having an inside diameter that is smaller than the diameter of the base part, and having an outside diameter that is smaller than a diameter of the cylindrical wall of the insertion cage.

17. A connection system, comprising:
    the connection device according to claim 11; and
    a threaded rod device configured to be received within the connection device,
    wherein the connection device can be separated from the threaded rod device by a wrench capable of disabling the at least one strip in the insertion cage, and adapted to the nut.

* * * * *